US005735031A

United States Patent [19]

Johnson

[11] Patent Number: 5,735,031

[45] Date of Patent: Apr. 7, 1998

[54] UNIVERSAL CLIP REMOVAL TOOL

[76] Inventor: Bryan T. Johnson, 4310 Hillview La., Vadnais Heights, Minn. 55127

[21] Appl. No.: 519,792

[22] Filed: Aug. 28, 1995

[51] Int. Cl.[6] .............................. B23P 19/04

[52] U.S. Cl. .............................. 29/235; 29/426.5; 81/426.5

[58] Field of Search .............................. 29/225, 235, 280, 29/426.5, 426.6; 81/418, 426.5, 486; 254/22

[56] References Cited

U.S. PATENT DOCUMENTS

| | | | |
|---|---|---|---|
| 838,008 | 12/1906 | Chandler et al. . | |
| 1,469,696 | 10/1923 | Raez . | |
| 2,716,273 | 8/1955 | Woodruff et al. | 29/229 |
| 3,161,085 | 12/1964 | Pratt | 81/3.8 |
| 4,872,251 | 10/1989 | Sheppard | 29/243.56 |
| 5,168,783 | 12/1992 | Shea | 81/424.5 |
| 5,391,181 | 2/1995 | Johnson et al. | 606/207 |

*Primary Examiner*—S. Thomas Hughes
*Attorney, Agent, or Firm*—Nawrocki, Rooney & Sivertson, P.A.

[57] ABSTRACT

Tool for releasably engaging and removing one-way clips. The tool includes a handle coupled to a tool head. The tool head includes a set of cooperating jaws formed of relatively thin, flat members for releasably engaging the clip and collapsing the clip during engagement of the clip.

17 Claims, 3 Drawing Sheets

*Fig.1*
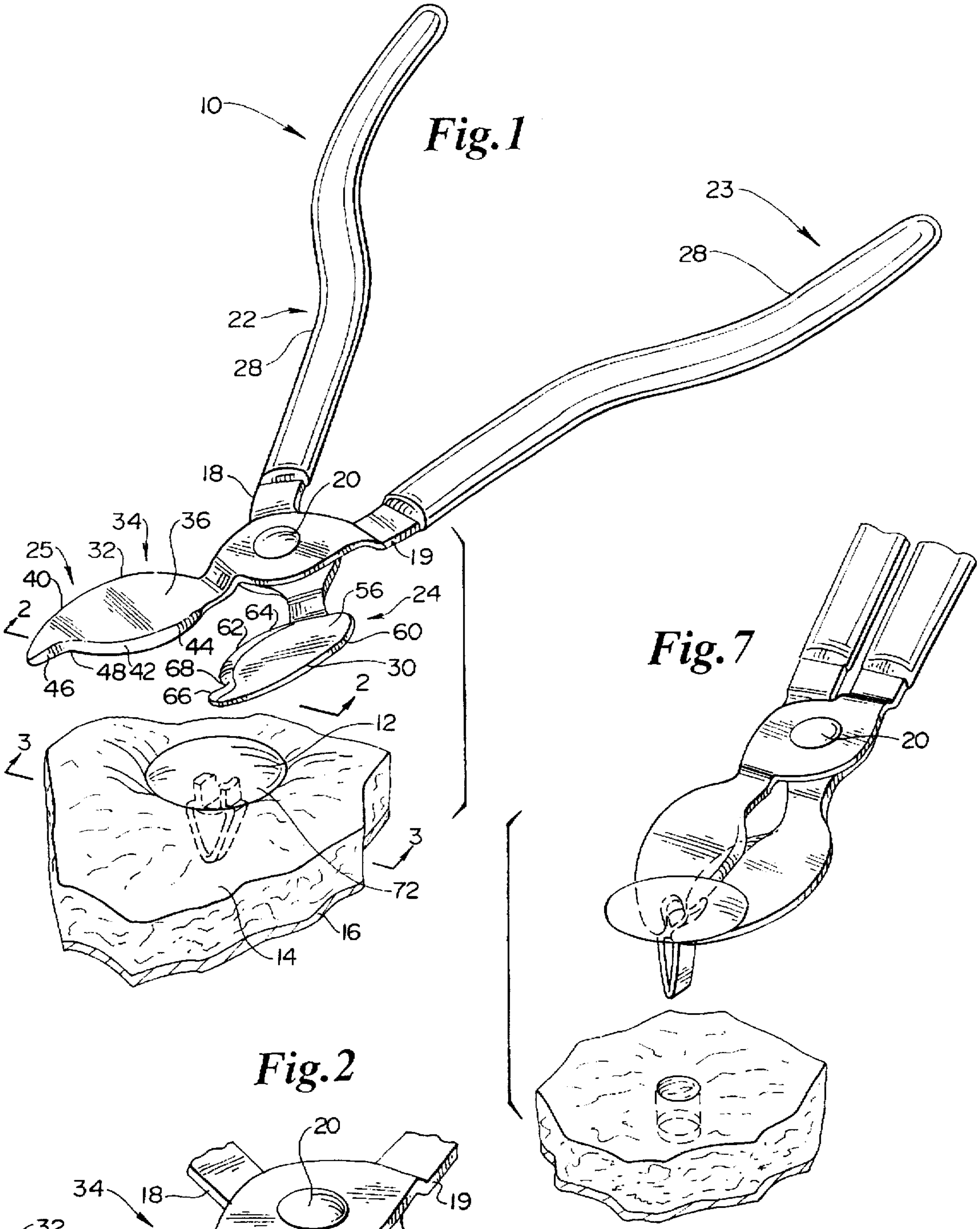
*Fig.7*
*Fig.2*
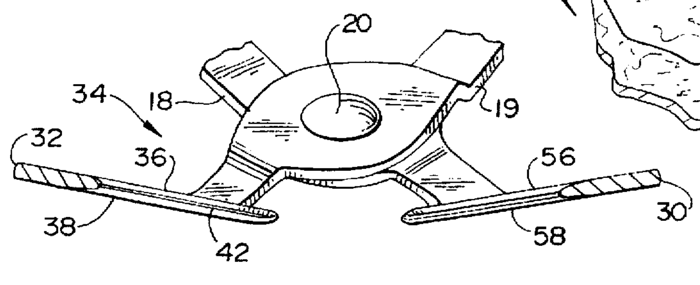
*Fig.3*
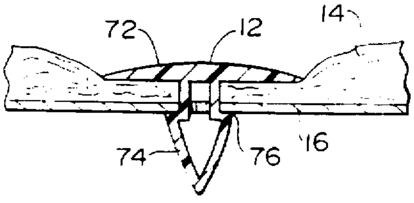

UNIVERSAL CLIP REMOVAL TOOL

FIELD OF THE INVENTION

The present invention relates to tools. In particular, the present invention relates to a universal clip removal tool. In one preferred embodiment, the tool is for use in the automobile industry, and is capable of removing automobile hood insulation clips and side trim clips for reuse, without causing damage to the clips or the automobile.

BACKGROUND OF THE INVENTION

One-way clips are used in the automobile industry for securing insulation blankets to automobile hoods and for securing automobile trim panels and moldings to the automobile body. In general, the automobile clips are one-way clips or fastener/retaining devices which expand or catch upon insertion.

In order to remove the clips, the clips must be broken. The process of removing a clip results in damage to the area surrounding the clip, including the insulation blanket. When the clips break, it is common for the clip head to separate from the stem, whereby the clip stem falls through the clip hole into an area or crevice within the automobile hood which may not be reached with a tool. The clips are costly to replace, Tools exist which are generally plier-shaped including a handle coupled to a set of jaws for securing or clamping about various specific devices. Examples of such tools are disclosed in Chandler et al., U.S. Pat. No. 838,008 (pliers for cutting, forming and clenching staples); Raez, U.S. Pat. No. 1,469,696 (combination tool including "gripping jaws" for engaging kitchen items); Woodruff et al., U.S. Pat. No. 2,716,273 (spring-inserting pliers); Pratt, U.S. Pat. No. 3,161,085 (fuse puller); Sheppard, U.S. Pat. No. 4,872,251 (fender fast clip remover); Shea, U.S. Pat. No. 5,168,783 (locking cable clamp); and Johnson et al., U.S. Pat. No. 5,391,181 (orthopedic holding forceps). None of the above referenced patents disclose a tool for removing one-way automobile clips, without causing damage to the automobile clip or the surrounding automobile structure.

SUMMARY OF THE INVENTION

The present invention is a universal one-way clip removal tool which is capable of removing one-way clips, including one-way automobile hood insulation clips and side trim clips for reuse without causing damage to the clips or the automobile.

In the preferred embodiment, the present invention includes a pliers for releasably engaging and removing one-way clips. The pliers include a handle. Means are rotatably coupled to the handle for releasably engaging the clip.

The means rotatably coupled to the handle may include a pair of cooperating jaws, each jaw formed of a relatively thin, flat member. The member may include an outside edge and an inside edge, wherein the means for collapsing the clip includes a contact region located on the inside edge. The contact region may be generally V-shaped.

The member outside edge may be rounded smooth. The member inside edge may be beveled.

In one embodiment, the pair of jaws are angled inward, forming an angle of less than 180° relative to each other. In another embodiment, the means rotatably coupled to the handle is angled relative to the plane of the handle.

Yet another embodiment of the present invention includes a pliers for removing automobile clips. The pliers includes a handle, having a tool head coupled to the handle. The tool head includes a set of cooperating jaws formed of relatively thin, flat members.

In one embodiment, the members include an inside edge having a contact region, the contact region may be generally V-shaped. The inside edge may be beveled. The cooperating jaws may be angled toward each other. The tool head maybe angled relative to the handle.

Yet another embodiment of the present invention includes a method of removing a one-way automobile clip from insertion. The method includes the steps of providing a pliers having a tool head including a set of relatively thin, flat cooperating jaws. The tool head is positioned below the clip head. The clip stem is engaged. The clip stem is collapsed, and the clip is removed.

Another embodiment of the present invention includes a pliers for removing one-way clips. The pliers includes a pair of clip-grasping jaws. Means are included for mating a first clip-grasping jaw to a second clip-grasping jaw for relative pivotal movement therebetween with respect to an axis. Each of said jaws defines an inside edge which approaches the other of said edges as said jaws pivot about said axis. Each jaw inside edge defines a generally V-shaped region therein at a distance from said axis substantially the same as the distance of the other generally V-shaped region from said axis.

The novel tool of the present invention allows one-way automobile clips to be removed from insertion for reuse without causing damage to the one-way clip or the automobile.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof, and wherein:

FIG. 1 is a perspective view of the universal clip removal tool in accordance with the present invention;

FIG. 2 is a fragmentary sectional view taken along line 2—2 of FIG. 1;

FIG. 3 is a fragmentary sectional view taken along line 3—3 of FIG. 1;

FIG. 7 shows the universal clip removal tool in accordance with the present invention engaging the automobile clip after removal;

DETAILED DESCRIPTION OF THE PREFERRED EMBODIMENTS

Figure 4:
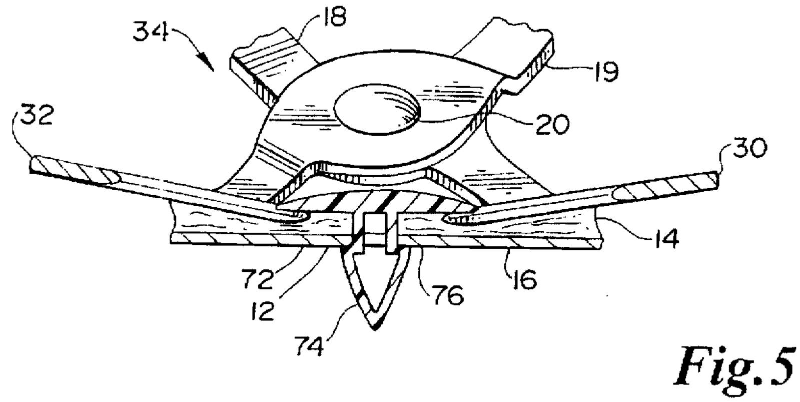
FIG. 4 is a fragmentary sectional view similar to that of FIGS. 2 and 3, showing the universal clip removal tool of the present invention engaging a one-way automobile clip.
Figure 5:
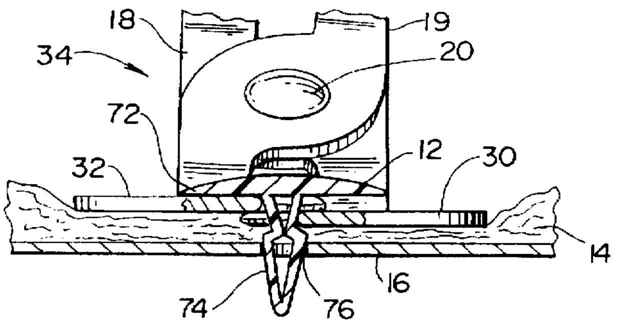
FIG. 5 is a fragmentary sectional view similar to that of FIG. 4, showing the universal clip removal tool of the present invention engaging a one-way automobile clip.

FIG. 1 shows the clip removal tool in accordance with the present invention generally at 10. Clip removal tool 10 is used for removing automobile clips 12 which are used for retaining insulation 14 to automobile hoods 16, or for other uses, such as retaining automobile trim panels to the automobile body.

Clip removal tool 10 is generally pliers shaped and includes a pair of lever arms 18 and 19 pivotally coupled together at pin 20. Lever arm 18 includes a proximal end 22 and a distal end 24. Lever arm 19 includes a proximal end 23 and a distal end 25. The clip removal tool 10 handle 26 includes the lever arm 18 proximal end 22 and the lever 19 proximal end 23. Handle 26 also includes grip members 28 and 29 which are formed about proximal end 22 and proximal end 23, respectively. The grip member 28 and grip member 29 aid in gripping the clip removal tool 10.

Tool head 34 includes jaw 30 and jaw 32. Jaw 30 is located at the distal end 24 of lever arm 18, and jaw 32 is located at the distal end 25 of lever arm 19. Jaws 30 and 32 are shaped for engagement and removal of automobile clip 12.

Referring to FIG. 2, a fragmentary sectional view of tool head 34 is shown. In general, jaw 30 is relatively thin, and generally lobe shaped. Jaw 30 includes a generally large, flat upper surface 36 and a generally large, flat lower surface 38. The upper surface 36 and lower surface 38 meet to form a smooth, rounded outside edge 40 and a smooth, beveled inside edge 42. Beveled inside edge 42 includes a rounded portion 44 and a tip portion 46 which meet to form a notched or V region 48.

Similar to jaw 30, jaw 32 includes a generally large, flat upper surface 56 and a generally large, flat lower surface 58. The upper surface 56 and lower surface 58 meet to form a smooth, rounded outside edge 60 and a smooth, beveled inside edge 62. Beveled inside edge 62 includes a body portion 64 (shown rounded) and a tip portion 66 which meet to form a notched or V region 68.

Figure 6:
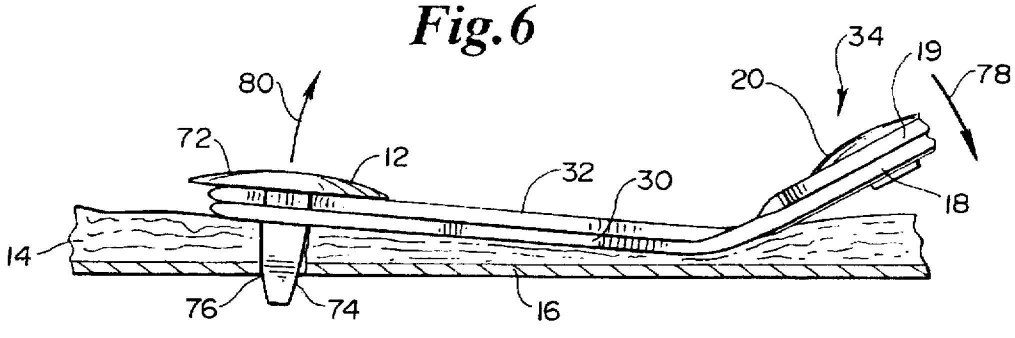
FIG. 6 is a fragmentary side elevational view showing the universal clip removal tool in accordance with the present invention removing a one-way automobile clip.

Tool head 34, including jaw 30 and 32, forms an obtuse angle with handle 26 (shown in FIG. 6). Additionally, jaw 30 and jaw 32 are angled slightly inward and form an angle of less than 180° relative to each other. Alternatively, jaw 30 and jaw 32 may be relatively straight, and form an angle of 180° relative to each other. As handle 26 lever arm 18 and lever arm 20 are closed together, the corresponding beveled inside edge 42 of jaw 30 moves toward and fits over the corresponding beveled inside edge 62 of jaw 32, for engaging an automobile clip 12 within the area defined by V region 48 and V region 68.

FIG. 3 shows a typical automobile clip 12 securing insulation blanket 14 to automobile hood 16. In one application, automobile clip 12 is a one-way expansion type clip which includes a head 72 and a stem 74. Alternatively, it is recognized that automobile clip 12 may be a one-way push-nail type clip, formed of plastic, rubber, or a similar material. When clip 12 is inserted, clip head 72 is positioned over insulation blanket 14 with stem 74 extending through hole 76 for retaining insulation blanket 14 against hood 16. Once inserted, automobile clip 12 stem 74 expands, snap-fitting in place. Once snapped in place, one-way automobile clip 12 cannot be easily removed.

FIGS. 4–7 show the removal of automobile clip 12 from insulation blanket 14 and hood 16 using the clip removal tool 10 of the present invention. Referring to FIG. 4, tool head 34 is positioned over automobile clip 12. As handle 26 is closed, jaw 30 and jaw 32 engage automobile clip 12. The beveled inside edge 32 and beveled inside edge 62 of jaw 30 and jaw 32 allow the clip removal tool 10 to access the clip stem 74 beneath the clip head 72. Jaw 30 and 32 being angled relative to each other allow jaw 30 and jaw 32 to pry beneath clip head 72.

As tool head 34 closes about automobile clip 12, stem 74 is retained within V region 48 and V region 68. V region 48 and V region 68 are located at corresponding locations in respective jaws 30 and 32, at approximately the same distance from pin 20. As handle 26 is closed together, V region 48 and V region 68 align to grasp automobile clip 12. Jaw 30 and jaw 32 engage stem 74 within V region 48 and V region 68, collapsing stem 74 and providing contraction of stem 74. Contracting stem 74 allows stem 74 to disengage from its retaining position with hood 16, and allows for removal of stem 74 through hole 76.

Referring to FIG. 6, tool head 34 is shown angled relative to handle 26, providing leverage for removal of clip 12 through hole 76. By a simple downward motion on handle 26, indicated by directional arrow 78, or a downward rocking motion, clip 12 is pulled up through hole 76, indicated by directional arrow 80. Referring to FIG. 7, automobile clip 12 is removed from insulation blanket 14 and hood 16 and available for reuse without damage to automobile clip 12 or insulation blanket 14 and hood 16. Typically, if automobile clip 12 is a one-way expansion clip, the clip 12 removes easily after the collapsing of stem 74. If automobile clip 12 is a plastic push-nail type clip, a simple downward rocking motion of handle 28 provides for easy "pop-out" removal of clip 12.

Tool head 34 is designed such that the tool head 34 will not damage the insulation blanket 14 or hood 16 during removal of automobile clip 12. Smooth, rounded outside edges 40 and 42, and the large surface area of generally flat lower surfaces 38 and 58 allow for removal of automobile clip 12 without damage to insulation blanket 14. Additionally, V region 48 and V region 68 allow automobile clip 12 to be grasped evenly from every direction during engagement and removal of the automobile clip 12. For one-way expansion, automobile clips, V region 48 and V region 68 allow clip 12 to be collapsed evenly from every direction during removal. Additionally, pointed tip portion 46 and tip portion 66 allow for easy access to the center of automobile clip 12 for removal.

It is recognized that the universal clip removal tool of the present invention is operable for removal of most all types of clips, in particular the one-way expansion clips and plastic push-nails used in the auto industry, including interior panel fasteners, hood insulation clips or fasteners, weather strip and trim panel clips, bumper facia clips, and similar general use retainer or one-way rivet type clips.

Figure 8:
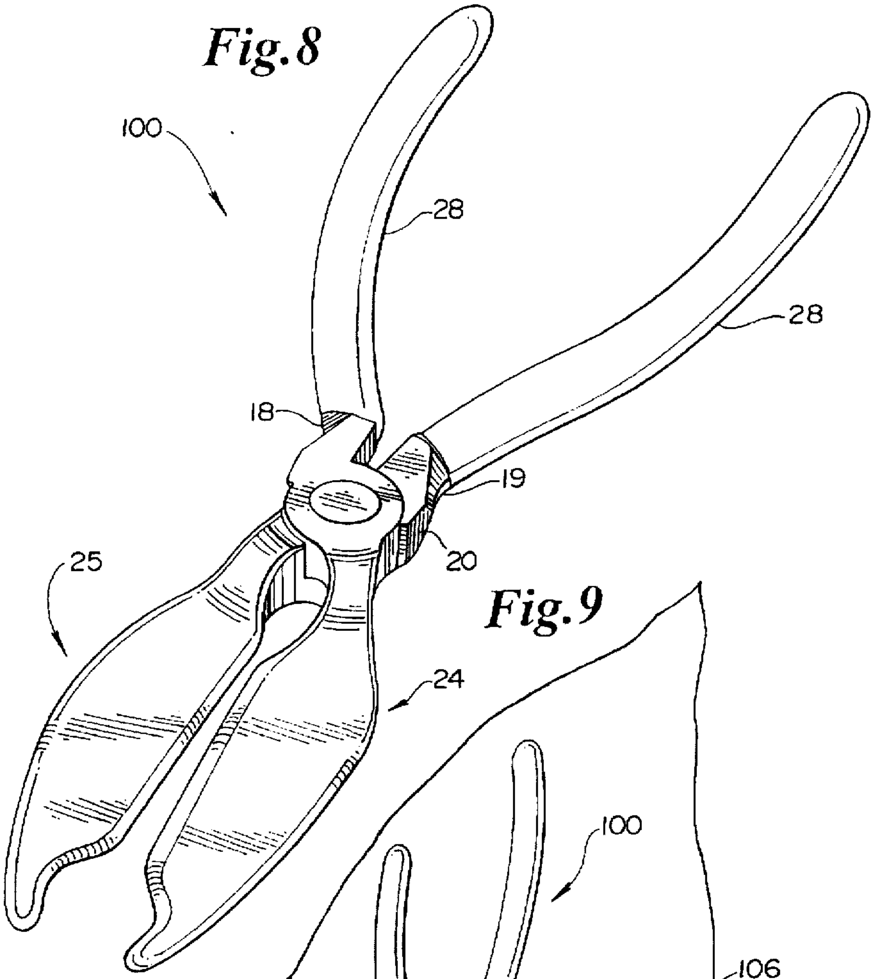
FIG. 8 is a perspective view of another embodiment of the universal clip removal tool in accordance with the present invention.
Figure 9:
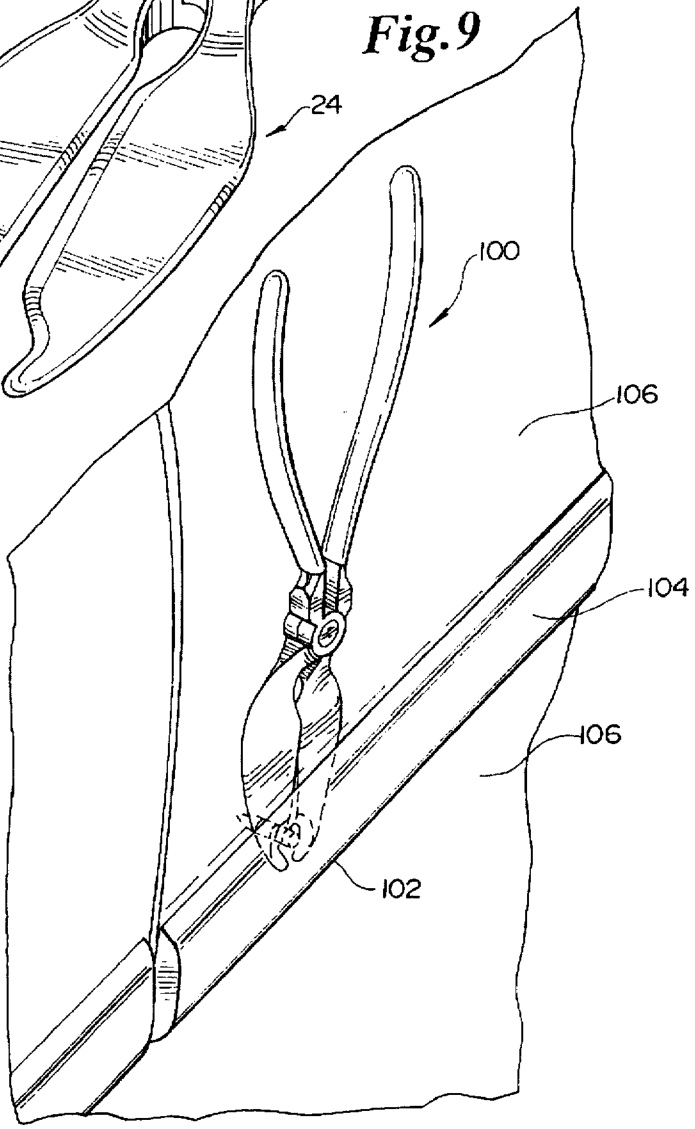
FIG. 9 is a fragmentary perspective view of the universal clip removal tool of FIG. 8 engaging an automobile trim panel clip for removal.

Referring to FIG. 8, yet another application of the universal clip removal tool 10 in accordance with the present invention is shown at 100. The clip removal tool 100 can be similar to the clip removal tool 10 as previously described herein. In this embodiment, handle 26 is in the same general plane as the tool head 34. Referring to FIG. 9, due to the generally flat tool head 34, the clip removal tool 100 allows for easy access and removal of trim panel automobile clips 102 which retain trim 104 to automobile body 106.

It will be understood that this disclosure is, in many respects, only illustrative. Changes may be made in details, particularly in matters of shape, size, material, and arrangement of parts, without exceeding the scope of the invention. Accordingly, the scope of the invention is as defined in the language of the appended claims.

What is claimed is:

1. A pliers for releasably engaging and removing one-way clips comprising:

a handle;

means operably coupled to the handle for releasably engaging the clip including a pair of cooperating jaws, each jaw formed of a relatively thin, flat member, wherein the pliers includes a closed clip engagement position for releasably engaging, collapsing and removal of the clip, and wherein when the pliers is in the closed clip engagement position, one jaw partially passes over the other jaw;

wherein the members include an outside edge and an inside edge, and wherein the means for releasably engaging the clip includes a contact region located on the inside edge, wherein the contact region is a generally V-shaped or notched region;

wherein each inside edge includes a tip portion and a body portion which meet to form the generally V-shaped or notched region; and wherein in said closed clip engagement position the portion of the inside edge of one jaw which passes over the portion of said other jaw includes the inside edge tip portion and the body portion.

2. The pliers of claim 1, wherein the outside edge is rounded smooth.

3. The pliers of claim 1, wherein the inside edge is beveled.

4. The pliers of claim 1, wherein the pair of jaws are angled inward relative to a horizontal plane.

5. (Amended) The pliers of claim 1, wherein the means operably coupled to the handle is angled relative to the plane of the handle.

6. A pliers for removing automobile clips comprising:

a handle;

a tool head operably coupled to the handle having a set of cooperating jaws formed of relatively thin, flat members, wherein the pliers includes a closed clip engagement position for releasably engaging, collapsing and removal of the clip, and wherein when the pliers is in the closed clip engagement position, one jaw partially passes over the other jaw;

wherein the members include an outside edge and an inside edge, and wherein the tool head includes a contact region located on the inside edge, wherein the contact region is a generally V-shape or notched region;

wherein each inside edge includes a tip portion and a body portion which meet to form the generally V-shaped or notched region; and wherein in said closed clip engagement position the portion of the inside edge of one jaw which passes over the portion of said other jaw includes the inside edge tip portion and the body portion.

7. The pliers of claim 6, wherein the inside edge is beveled.

8. The pliers of claim 6, wherein the cooperating jaws are angled inward toward each other.

9. The pliers of claim 6, wherein the tool head is angled relative to the handle.

10. A pliers for removing one-way clips, comprising:

a pair of clip-grasping jaws;

means mating a first clip-grasping jaw to a second clip-grasping jaw for relative pivotal movement therebetween with respect to an axis, wherein said jaws cooperate in a closed position to releasably engage the clip and collapse the clip during engagement of the clip;

wherein each of said jaws defines an inside edge which approaches the other of said edges as said jaws pivot about said axis;

wherein each jaw inside edge defines a generally V-shaped or notched region therein at a distance from said axis substantially the same as the distance of the other generally V-shaped or notched region from said axis and wherein a portion of the inside edge of one jaw passes over a portion of said other jaw in said closed position; and wherein each inside edge includes a tip portion and a body portion which meet to form the generally V-shaped or notched region; and wherein in said closed position the portion of the inside edge of one jaw which passes over the portion of said other jaw includes the inside edge tip portion and the body portion.

11. A pliers having a tool head operably coupled to a handle for removing collapsible one-way clips for reuse, the clips useable as automobile hood insulation clips and automobile side trim clips, the clips including a clip head and a clip stem, wherein the clip stem is collapsible, the tool head comprising:

a first jaw and a second jaw which cooperate in a closed position to releasably engage the clip stem and collapse the clip stem during engagement of the clip;

means mating the first jaw to the second jaw for relative pivotal movement therebetween with respect to an axis;

wherein each of said jaws includes a relatively thin, flat member having an inside edge which approaches the other of said edges as said jaws pivot about said axis;

wherein each jaw inside edge defines a generally V-shaped or notched region therein a distance form said axis substantially the same as the distance of the other generally V-shaped or notched region from said axis; and wherein when a portion of the inside edge of one jaw passes over a portion of said other jaw in said closed position, wherein each inside edge includes a tip portion and a body portion which meet to form the generally V-shaped or notched region, and wherein in said closed position the portion of the inside edge of one law which passes over the portion of said other jaw includes the inside edge tip portion and the body portion.

12. The tool head of claim 11, wherein the tool head is capable of collapsing the clip from any direction.

13. The tool head of claim 11, wherein each jaw is generally lobe-shaped.

14. The tool head of claim 11, wherein each jaw includes a relatively pointed end.

15. The tool head of claim 11, wherein each inside edge includes a smooth, beveled portion.

16. The tool head of claim 11, wherein each jaw is angled inward towards each other.

17. The tool head of claim 11, wherein the tool head is angled relative to a plane defined by the handle to form a lever arm assembly.

* * * * *

UNITED STATES PATENT AND TRADEMARK OFFICE

CERTIFICATE OF CORRECTION

PATENT NO. : 5,735,031

DATED : April 7, 1998

INVENTOR(S) : Johnson

It is certified that error appears in the above-identified patent and that said Letters Patent is hereby corrected as shown below:

Column 2, line 7, after "head" replace "maybe" with --may be--.

Column 5, line 28, after "5." Delete --(Amended)--.

Column 5, line 43, after "generally" replace "V-shape" with --V-shaped--.

Column 6, line 43, after "one" replace "law" with --jaw--.

Signed and Sealed this

Second Day of February, 1999

*Attest:*

Q. Todd Dickinson

*Attesting Officer*

*Acting Commissioner of Patents and Trademarks*